United States Patent [19]
Muzio et al.

[11] Patent Number: 5,801,692
[45] Date of Patent: Sep. 1, 1998

[54] AUDIO-VISUAL USER INTERFACE CONTROLS

[75] Inventors: Simon C. Muzio; Randall R. Omel; Barry J. Linnett, all of Seattle, Wash.

[73] Assignee: Microsoft Corporation, Redmond, Wash.

[21] Appl. No.: 564,977

[22] Filed: Nov. 30, 1995

[51] Int. Cl.$^6$ ................................................. G06F 3/00
[52] U.S. Cl. ................................................. 345/339
[58] Field of Search ........................ 395/333, 334, 395/339, 348, 977, 978; 345/333, 334, 339, 348, 349, 352, 354, 977, 978

[56] References Cited

U.S. PATENT DOCUMENTS

| | | | |
|---|---|---|---|
| 5,079,723 | 1/1992 | Herceg et al. | 345/352 |
| 5,169,342 | 12/1992 | Steele et al. | 345/146 |
| 5,223,828 | 6/1993 | McKiel, Jr. | 345/163 |
| 5,287,102 | 2/1994 | McKiel, Jr. | 345/348 |
| 5,374,924 | 12/1994 | McKiel, Jr. | 345/340 |
| 5,452,416 | 9/1995 | Hilton et al. | 345/346 |
| 5,461,399 | 10/1995 | Cragun | 345/145 |
| 5,515,495 | 5/1996 | Ikemoto | 345/342 |
| 5,533,182 | 7/1996 | Bates et al. | 345/326 |
| 5,544,295 | 8/1996 | Capps | 345/473 |
| 5,612,719 | 3/1997 | Beernink et al. | 345/173 |
| 5,687,331 | 11/1997 | Volk et al. | 395/327 |

*Primary Examiner*—A. Katbab
*Attorney, Agent, or Firm*—Klarquist, Sparkman Campbell Leigh and Whinston LLP

[57] ABSTRACT

Audio-visual user interface controls provide audio and a visual feedback in response to user input events in a graphical user interface environment of a computer. A variety of audio and visual responses of a control assist the user in understanding its operation.

25 Claims, 4 Drawing Sheets

AUDIO-VISUAL USER INTERFACE CONTROLS

FIELD OF THE INVENTION

The invention relates to a user interface for a computer, and more specifically, to user interface controls.

BACKGROUND OF THE INVENTION

Novice computer users find computers confusing and even intimidating. Even with innovations to user interface design that make computers more "user-friendly," many users find learning to use a computer a frustrating experience. One significant problem with the user interface of even today's user-friendly programs is that they include controls that are not intuitive to use.

A control is a feature of a graphical user interface that enables users to input data, select options, invoke commands, etc. Though adaptable to a variety of user interface designs, these controls are typically found in graphical windowing environments such as the graphical windowing environment of Windows operating systems from Microsoft. Common examples of controls include push buttons, check boxes, and list boxes. The controls in the user interface operate in conjunction with a cursor positioning device such as a mouse or track-ball. To interact with a control displayed on the computer monitor, the user positions a cursor over the control and actuates a button on the positioning device or keyboard. Users can select options, enter data, or even move items on the display by moving the positioning device and pressing its button, and pressing keys on the keyboard.

While a vast improvement over text-based interfaces, the controls in graphical interfaces still require a great deal of practice to master. These controls do not give the novice user helpful feedback. For instance, a user may not know when he or she has properly positioned the cursor over control. Once the user has positioned the cursor over a control, it is often difficult to maintain the cursor in the proper place. For users with poor hand-mouse coordination, operating a control can be a frustrating experience.

Moreover, the user may not know whether pressing a mouse button while the cursor is positioned over a control will actually accomplish the desired action. In one instance, clicking on a control may not initiate any action because a control is inactive or the user has made a mistake positioning the cursor. In another instance, clicking on a control may initiate an unexpected action. As such, it often takes repeated cycles of trial and error before the user understands the control.

One way to improve on these controls is to add additional feedback to help the user understand how the controls work. Unfortunately, existing user interface controls have not employed sufficient helpful feedback. In some programs, the appearance of a cursor changes when the cursor moves over a control. In other programs, the control causes the computer to emit a generic "beep" when the user releases a mouse button over a control. This limited feedback does not provide much guidance to the user because it is typically common to a variety of types of controls. The feedback does not help the user distinguish among different types of controls, especially in today's graphical user interfaces having several different types of controls.

In addition to the variety of controls in a typical interface, each control typically has a variety of states. The state of the control depends on the position of the cursor and the actuation status of the push button on the mouse. The combination of cursor position and mouse button status can lead to many different control states. The cursor is either positioned over a control or outside the control. For each position, the user can press and release, or press and hold the mouse button. Due to the number of different states, it is often difficult for novice users to determine which input actions correspond to the users' intended actions. As such there is a need for more helpful and user-friendly controls that guide the user.

SUMMARY OF THE INVENTION

To address the limitations and drawbacks of existing user interface controls, the invention provides improved user interface controls with audio and visual responses. In one implementation of a user interface control according to the invention, the user interface control produces both visual and audio responses when predefined user input events are detected. The code supporting these controls monitors the position of the cursor on the display, the state of the pointing device (e.g. mouse button down/up), and the order in which position and state messages are received to detect user input events. In response to predefined events, such as the cursor passing over the boundary of a control, or mouse button down while the cursor is over the control, the control changes in appearance on the display and the computer plays back an associated audio response.

The visual and audio responses vary with the type of event so that the user can learn how different types of user input produce different types of response by the computer. In one implementation, the visual response can be comprised of frames of animation played in sequence. Sounds can be attached to frames to reinforce the effect of the change in visual appearance. In addition to the visual response of the control, the cursor on the display can also change in appearance when predefined user input events are detected. The combination of the response from the control as well as the cursor provides additional assistance to novice users learning how to operate controls in a foreign user interface environment.

A number of controls can share common visual and audio responses to help users learn the operation of controls having a similar function. By associating common responses with controls that perform similar tasks, the user interface helps novice users learn how related of groups or families of controls work.

Further advantages and features will become apparent from the following detailed description and accompanying drawings.

DETAILED DESCRIPTION

The preferred implementation of the invention provides improved user interface controls. These controls include a combination of audio and visual feedback that make the control easier to use and understand. Providing visual feedback, the controls and cursor change in appearance when the user positions the cursor over the controls. Supplementing the visual feedback, the audio feedback includes associating sounds with the changes in appearance of the cursor and control. In addition to supplementing visual feedback, audio feedback is used to distinguish among different events in some cases where the visual response is the same.

We begin with a description of a computer system used to implement an embodiment of the invention. Next, we describe the architecture of a system for supporting user interface controls designed according to an embodiment of the invention. Later, we describe the creation and operation of these user interface controls.

Figure 1:
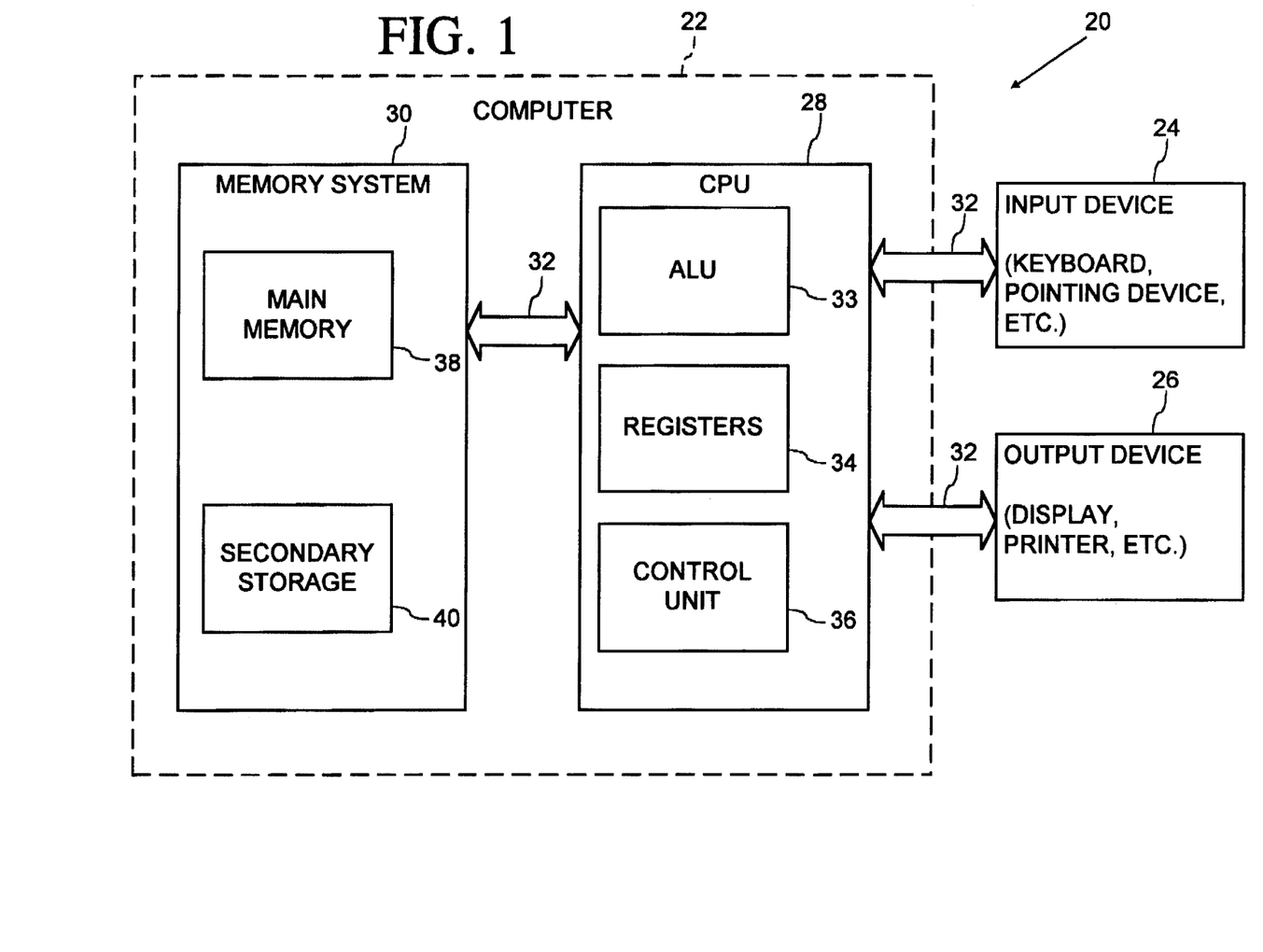
FIG. 1 is a block diagram illustrating the architecture of a computer system used to implement an embodiment of the invention.

FIG. 1 is a block diagram of a computer system 20 which is used to implement a method and system embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical, magnetic or other recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 includes a display device, and a sound device.

The display device is preferably a Super VGA, 256-color monitor. To control the monitor, the computer system includes a compatible video card. Any of a number of video cards compatible with the SVGA standard can be used.

The computer system includes a sound device for playing audio feedback associated with controls in the user interface. Any of a number of commercially available sound cards can be used. Preferably the sound card should support playback of one or more PCM-format digital audio streams in common formats: 8 or 16 bits per sample; 11, 22, or 44 kHz sample rate; mono or stereo. An embodiment of the invention can be implemented using the Windows Operations System version 3.1 or greater, from Microsoft Corporation. In a Windows compatible embodiment, the Windows operating system includes a dynamic linked library called "mmsystem.dll." The combination of mmsystem.dll and a Windows-compliant sound card digital audio driver is sufficient to receive messages from audio-visual controls and initiate audio playback. In this implementation, a dynamic linked library called wavemix.dll can be used to mix sound files. Two files supporting this feature, wavemix.dll and wavemix.ini, are part of the Windows operating system.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

An operating system, loaded into memory of the computer system, provides a number of low level functions to support the operation of an embodiment of the invention. In general, the operating system is responsible for controlling the allocation and usage of a hardware resources such as memory, CPU time, disk space, and peripheral devices. As is well-known, operating systems provide such low level functions as module (process and dynamic link library) management, scheduling, interprocess messaging, memory management, file system management, and graphical user interface support.

Though the invention can be implemented using variety of different operating systems, the embodiment to be described is implemented in a computer system installed with a Windows operating system, version 3.1 or greater, from Microsoft Corporation.

Figure 2:
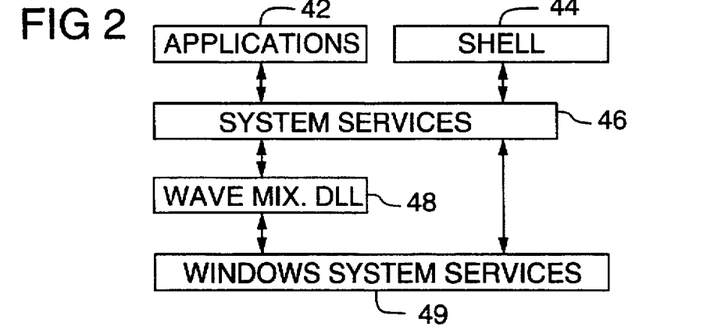
FIG. 2 is a block diagram illustrating the architecture of a system supporting user interface controls according to an embodiment of the invention.

FIG. 2 illustrates the architecture of a system according to an embodiment of the invention. The system includes one or more applications 42, which can be invoked from the shell program 44. Both the applications and shell program rely on the system services 46 to support user interface controls.

The system services 46 provide an application programming interfaces (API) to allow the applications and shell program to access system services. The API specifies a set of functions and associated parameters. In this embodiment, the functions are implemented as OLE 2.0 component objects. Component objects are described in more detail in "Inside OLE 2" by Kraig Brockschmidt, Microsoft Press, 1994. Services supporting user interface controls are described in further detail below.

The system services 46 include animation services called by the shell and applications to play one or more frames of animation in response to predefined user input events. In this system, user interface controls are implemented using animation files. The applications and shell programs receive messages when predefined user input events occur at a control. In response to these messages, the programs call the animation services to control playback of animation. The animation services, in turn, rely on lower level services to generate graphics on the display, and to produce sound.

To support an audio response, in addition to the visual response provided in an animation, the animation services call "Wavemix" 48 to playback sound frames. Wavemix is a dynamic linked library including several functions to control play back of sound waveform files called "*.wav" files. Wavemix supports up to 8 channels of simultaneous wave play, the ability to queue up waves along the same channel and wave completion notification.

The wavemix DLL supports 11.025 kHz, 22.05 kHz and 44.1 kHz 8-bit Mono. Wavemix automatically converts the input sampling rate of a .wav file to the output sampling rate when opening the .wav file. The sampling rate for the system is set in another file called "wavemix.ini."

Windows system services 49 in the Windows Operating System provide low level support to Wavemix and the system services. The system services 49 provide support for playing a sound wave as noted above. They also provide support for drawing an image on the display and setting a timer that calls back after a specified interval.

Having described the system architecture of the embodiment, we now describe the user interface controls in more detail.

The user interface for applications and the shell program include families of controls. A "family" of controls is a group of controls in the user interface that provide similar functions. The common purpose or behavior of controls in a family is reinforced by common audio and visual characteristics. The controls described here relate primarily to navigational controls, but the concepts can be applied to other types of controls, regardless of their function in a user interface. A "navigational" control is a control designed to assist the user in "navigating" the user interface.

Grouping related controls into families helps the user learn how to use controls more quickly. When the user understands how one control in a family operates, he or she can easily understand how the entire family operates. A family of controls can have one or more sets of common feedback. For instance, all controls in a family have the same behavior when in the inactive state. This behavior for an inactive state emulates other, more familiar electronic devices which produce distinctly different sounds when the power is turned off. Controls in the family share similar behavior in the active state, except that the sound associated with the operative function of a control is unique.

Before describing the detailed characteristics of audio feedback in an implementation, it is helpful to begin by introducing some factors that affect the type of audio feedback. The behavior of a control, or a family of controls, can be characterized in terms of an active and an inactive state. The state of the control as the cursor enters a control also affects the audio feedback of the control. Finally, a concept called "masking" also affects the audio feedback.

"Masking" refers to the affect in the real world in which one sound can hide the occurrence of another sound if the two play together. The embodiment of the invention described here emulates masking in its support for inactive and active-state behaviors.

Inactive-state visual and audio behaviors are meant to reinforce the tactile qualities of a physical control, e.g. how large it is, what material it is made from, how heavy it is, how far the travel is from the up to down position, smooth travel, ratcheted travel, etc. The operation of a control, therefore, emulates the operation of a real-world, physical device.

The example of a "squishy" control will illustrate this concept. A squishy control is a control in one implementation of the user interface that emulates a flexible rubber button in the real world. Inactive-state behaviors include:

1. Mouse button down while in the control.

For a squishy control, this action causes a visual depression of the control, plus an airy, squishy sound that further reinforces the control's visual and tactile qualities.

2. Leaving the control while the mouse button is still down.

In response to this action, the squishy button pops back up, and is accompanied by a slightly smaller airy, squishy sound that again reinforces the control's visual and tactile qualities.

3. Re-entering the control while the mouse is still down, assuming the mouse had gone from up to down within the control initially.

This action causes the same visual and audio behavior as in case 1 for the squishy button. This is an example of audio masking. When the mouse cursor re-enters the control, two visual responses occur: the shape of the button changes so that it appears visually depressed, and a region around the edge of the button lights up. However, the user only hears the dominant sound of the button being depressed. Even if the visual illumination made a sound, the user does not hear it because it is masked by the dominant sound.

Active-state behaviors indicate when a control is active and also indicate that the user has properly clicked on a control to launch a desired action. Active-state behaviors include:

1. The mouse entering or leaving the control when the mouse is up.

For the example of the squishy control, this causes the region around the edge of the control to light up or turn off. This visual response is accompanied by a tiny click sound to supplement the visual illumination of the control.

The contrast in behavior between the active and inactive states emulates a real world device, which operates differently if the power is on and off. Defining a behavior as active adds the benefit of being able to provide additional feedback to the user when a control is available to perform an action.

2. Mouse up within the control, assuming it went from up-to-down within the control initially.

This action causes the same visible behavior as in Inactive-State #2 above, namely, the control visually pops up. However, the accompanying sound is different and depends on the function of the control. For example, if the button being manipulated is an OK button, we hear a musical, emphatic tone that reinforces the concept that a desired action is being carried out.

This is also another example of masking. Visually and in a tactile sense, the button pops up whether it is active or not. Likewise, it makes a soft popping up sound conceptually, whether it is active or not. However, the pop up sound is conceptually masked by the dominant, musical sound in the case of the OK button. Appendix A includes more examples of control behavior.

An additional example will further illustrate the behavior of a control. One example of a control with audio and visual feedback is the single-state "OK" push button. Table 1 lists visual and audio response of the control depending on the position of the cursor, and the state of the mouse button.

TABLE 1

| LOCATION OF MOUSE/CURSOR | STATE OF MOUSE BUTTON | APPEARANCE | SOUND |
| --- | --- | --- | --- |
| Outside control | Mouse up | Rest image | None |
| Over control | Mouse up | Highlighted | Sound of highlight turning on |
| Over control | Mouse down | Highlighted and shifted down and to the right | Mouse down sound |
| Over control | Mouse up | Rest image | Action sound |
| Outside control | Mouse down | Idle | Generic mouse up sound when moved outside control |

Figure 3:
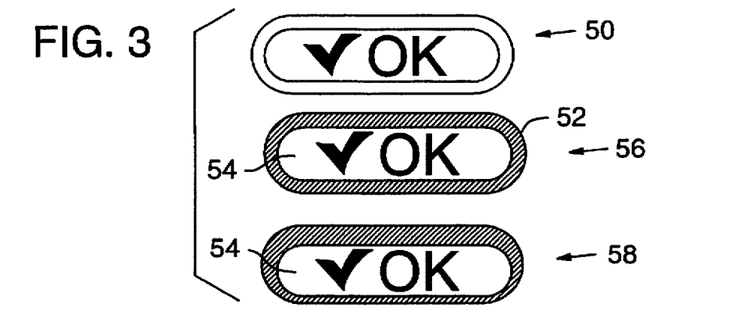
FIG. 3 is an example illustrating different visual states of a user interface control according to an embodiment of the invention.

The visual and audio responses of the OK push button control help the user understand its operation. A typical sequence of operation occurs as follows. If the user positions the cursor outside the OK control and the mouse button is up, the OK button is in an idle state. The OK button in the idle state has the appearance of the rest image 50 as shown in FIG. 3.

When the user positions the cursor over the OK control with the mouse button up, the area (52) surrounding the inner portion (54) of the button is highlighted and the sound of a highlight turning on is played back. This visual state 56 of the button is shown in FIG. 3. The combined audio and visual response tells the user that the OK button is active and that the cursor is properly positioned over the control.

If the user then presses the left mouse button down while keeping the cursor positioned over the control, the inner portion (54) of the push button is shifted down and to the right by one pixel in each direction, and the generic mouse button down sound is played back. In this visual state 58, the shifting of the inner portion gives the appearance that the button is pushed in. The combination of shifting the inner portion down and to the right, and playing back a different sound associated with pushing the button in, emphasizes to the user that he or she has actuated the control.

At this point, no action occurs unless the user releases the mouse button while the cursor is positioned within the control. If the user releases the mouse button the appearance of the control returns to the rest image 50 and the action sound is played back. This combination of visual and audio responses makes the push button appear as if the button has been released. The action sound helps reinforce to the user that the release of the button has initiated a desired action.

If instead of releasing the button, the user holds the button down and moves the cursor outside of the control, the rest image 50 is displayed and the generic mouse button up sound is played back. This response helps indicate that the user has moved the cursor outside of the control and that releasing the button will initiate no action. If the user then moves the cursor back over the control the inner portion will again be shifted down and to the right and the button will be highlighted. Another sound is associated with this movement to reinforce to the user that the cursor is properly positioned over the control.

While this example provides a general overview of the behavior of a button, more detail regarding the operation of controls with audio and visual feedback is provided below.

In this embodiment, controls with audio and visual feedback are implemented using animation. A control typically has a number of states corresponding to predefined events. These predefined events, in turn, correspond to user input through a cursor positioning device such as a mouse. When an event occurs, the system plays back an animation or animations associated with the state of the control.

The visual response of a control is comprised of one or more frames of animation. Each frame of animation can include a single image or a combination of images. To associate sound with a frame of animation, the animation frame is linked to one or more waveform files to be played along with the display of the frame of animation.

In general, an animation associated with a control consists of a number of frames. The first and last frames contain the rest frame image. In addition to the first and last frames containing the rest image, the animation also includes one or more additional frames, each potentially containing one or more images.

Each frame can contain several frame parts in this embodiment. In creating a frame, an animator specifies the size and shape of a frame part as well as the z-order. As described in the data structures below, z-order of frame parts are stored in an array to keep track of the relative z-order of frame parts in a frame of animation.

For each frame, the developer also specifies the frame's duration. In this embodiment, frame duration ranges from zero to 32,000 per 60th of a second. In practice however the actual refresh rate of the display on the computer may not be faster than 5/60 of a second.

Each frame has the ability to hold a waveform (*.wav) sound file. The developer of a control specifies the waveform sound file associated with a frame.

In a typical animation, the developer specifies a sequence of frames that comprise the animation. Each frame has the ability to have up to three sequential branches. Each branch has a target frame and a probability value from zero to 100%. If set to 100%, the target frame is always the same frame. Otherwise, the target frame is chosen among 2–3 possible frames according to the specified probability.

Actions consist of a sequence of events. These events can be frames that display an image for a period of time, sounds that start with the next frame event, and branching events that can specify a random probability that the action will jump to a different location in the sequence. A single action can therefore unfold in a variety of ways, or loop indefinitely until a new action is requested.

To achieve continuity when a new action is requested, the old action is coerced to its final frame by shortening the duration of all frames to a set minimum. Also, the probabilities of all branch events are changed such that it will always branch forward in the sequence, and never branch backwards. Thus, an animation with a branching event that loops back 100% of the time will loop indefinitely until a new action is requested. In addition, animations may insert events that branch forward zero percent of the time, which will only be taken when a new action is requested.

In this embodiment, actions are played using a timing service that can handle any number of animations with a single system timer. In a timer callback function, the timer service calls all the animations that need to display a new frame. It then determines the time to the next new animation frame, and resets a system timer for this new duration. Immediately after the animation displays a new frame, it calculates the next frame to display, dropping frames as necessary to insure that frames occur synchronously with sound. When it gets a new frame, it pre-loads the sound and image in that frame so they will be ready to go when the next timer event occurs.

Table 2 below illustrates portions of the animation data structure. In this system, the same structure is used for characters as well as an animations associated with user interface controls. Thus, the following structure includes additional information to support both characters as well as controls.

TABLE 2

HEADER

| | | |
|---|---|---|
| [Long] | sMagic | = 11071960 |
| [int] | sVersion | = example 100 = 1.00 <<current version .90>> |
| [int] | nFrameWidth | = twips |
| [int] | nFrameHeight | = twips |
| [int] | nType | = 1 for personal character, 2 for specialist character, 3 single-state, 4 multi-state, 5 general animation |

EXTRA INFO

| | | |
|---|---|---|
| [int] | cBytes | = number of bytes of extra info |
| [int] | nHelpfulIndex | = works with tracking service to decide whether to present a tip |
| [int] | nScaleFactor | = (Editor Only) Amount to scale authored size of metafiles in editor |
| [int] | nEditorTwipsPerPixelX | |
| [int] | nEditorTwipsPerPixelY | = Number of twips per pixel in original authored version. Allows scaling to authored pixel size regardless or display resolution |
| [int] | nPercentScreenWidth | |
| [int] | nPercentScreenHeight | = % of original authored screen * 100. (ex. 38.45% = 3845) Used to scale animation to same % of screen on any display |
| [long] | xTile1 | |
| [long] | xTile2 | = position to cut frame between tile 1 and 2. Used for tiling of base buttons to allow them to grow horizontally, not by stretching but by tiling of middle tile. |

PARTS (written in contiguous id order)

| | | |
|---|---|---|
| [int] | cParts | |
| For each part | | |
| [int] | I | = (editor use only) part's cell number |
| [int] | id | = part's unique id number |
| [int] | cch | |
| [string] | szFilename | = graphic file |
| [int] | xDefault | = (editor use only)(twips) default part placement |
| [int] | yDefault | |
| [int] | x2Default | |
| [int] | y2Default | |

SOUNDS (written in contiguous id order)

| | | |
|---|---|---|
| [int] | cSounds | |
| For each sound | | |
| [int] | id | = Sound's unique id number |
| [int] | cch | |
| [string] | szFilename | = waveform file |

INSTANCES OF PARTS IN FRAMES

| | | |
|---|---|---|
| [int] | cFParts | |
| For each fpart | | |
| [int] | idPart | = id of the part whose instance this is |
| [int] | x | = (twips) |
| [int] | y | |
| [int] | x2 | |
| [int] | y2 | |

REST FRAME INFO (written in contiguous id order)

| | | |
|---|---|---|
| [int] | cRestFrames | |
| For each frame | | |
| [int] | id | = unique id for this frame |
| [int] | cFParts | = number of parts in this frame |
| [int] | iStartFPart | = index of first part in then part list |

FRAMES (written in contiguous id order)

| | | |
|---|---|---|
| [int] | cFrames | |
| For each frame | | |
| [int] | nType | = (editor use only) could be removed |
| [int] | id | = unique id for this frame |

TABLE 2-continued

| | | |
|---|---|---|
| [int] | cFParts | = number of frameParts in this frame |
| [int] | iStartFPart | = index of first framePart in framePart list |
| [int] | idRestFrame | = −1 if not restframe |
| [int] | nDelay | = 60ths of second |
| [int] | idSound | = id of sound in SOUND array |
| [int] | nLoops | = (0: play once, no loops) (−1: loop until animation ends) (range: −1 to 999) |
| [int] | idFrameBranch1 | = id number of frame to branch to |
| [int] | nProbability | = percent (0–100) |
| [int] | idFrameBranch2 | |
| [int] | nProbability2 | |
| [int] | idFrameBranch3 | |
| [int] | nProbability3 | |

SEQUENCES OF FRAMES (ANIMATIONS)

| | | |
|---|---|---|
| [int] | cSeqs | |
| For each sequence | | |
| [int] | cFrames | = number of frames in this animation |
| [int] | iStartFrame | = index of first frame list |
| [int] | idRestFrame | = id of the restframe for this sequence |
| [int] | cch | |
| [string] | szComment | = (editor use only) author's name for the sequence |

ACTIONS

| | | |
|---|---|---|
| [int] | cActions | |
| [int] | gIdActionUnique | = (editor use only) keep last unique id for each action |
| [int] | nType | = 1 for required, 2 for personal, 3 for specialist |
| [int] | id | = unique id for the action |
| [int] | cch | |
| [string] | szName | = name of action |
| [int] | cSeqs | = number of sequences for this action |
| [int] | iStartSeq | = index of first sequence in sequence list |

The animation services include several functions to allow applications to create and manage animations. In this embodiment, the animation services include the following code to support animation for a control: a character services dynamic link library, an IAnimation Interface, and the IAnimationSite Interface.

The character services DLL includes the "OpenAnimation" function, which an application calls to create an animation on the display. The parameters for this function are: 1) the name of the animation file (szFile); 2) the name of the animation (szAnim); 3) a pointer to an "IAnimationSite" interface (pAnimSite); 4) a window handle identifying the window to hold the animation (hwnd); 5) the initial position of the animation (lprc); 6) a number representing the "AutoSize" mode (aas); and 7) a pointer to a location to receive the "IAnimation" interface (ppAnimation).

It is important to distinguish the IAnimation and IAnimationSite interface. The IAnimation interface includes a number of member functions to allow an application to manage the display of animations.

The IAnimationSite interface is a collection of callback functions implemented by the application. Animation services call these functions to the let the application know when there is a new animation frame to play, or when a previous animation has finished when animations are played asynchronously.

If the application specifies a pointer to the IAnimationSite interface, the application is responsible for seeing that the control is displayed in response to WM_PAINT messages and new animation frames by specifically calling a function to draw the frame. The window identified by the window handle is used to get the background behind the control.

If this window handle identifies a Visual Basic form or control, then it will send a WM_PAINT message with wPARAM set to an off-screen hdc in order to get a background image. The reference to "Visual Basic" forms or controls refers to the support for a form or control in Microsoft's Visual Basic programming language system. An "hdc" literally means a handle to a device context. An hdc is a graphical pointer for display screen and printer outputs.

If the window handle does not identify a Visual Basic form or control, it will send a WM_CTLCOLOR message, as well as a special registered window message to allow the parent window to paint the background.

If a pointer to the animation site interface is not provided, then the animation services create a child window of the window specified by the application through the window handle and control all painting.

The IAnimation interface includes a number of functions to manage animations including:

PlayAction(action, wFlags), GetAction( ), DrawFrame (hdc), SetRect(lprc, aas), GetRect(lprc), GetTextRect (lprc), and IsIntersecting(ppt).

When an application calls the "PlayAction" function and specifies an action, the animation services play the specified action. The animation services achieve continuity with the current action by causing the current action to end quickly and smoothly before the new action starts. The function will not return until the new action is started. If the animation does not have an implementation of the given action, then the function will return "not defined".

An animation may have multiple definitions of the same type of action. In this case, the animation actually performed will be randomly selected from the set of definitions for that action.

The "GetAction" function returns the current action when called by an application.

The "DrawFrame" function draws a current frame of the animation on a given hdc. The animation is drawn at the location where it was created or last moved. If the window handle is not null when the animation is opened, it is buffered off screen; otherwise, the hdc is assumed to be an off-screen buffer.

The "SetRct" function moves the animation to a specified position.

The "GetRect" returns the current size and position of the animation.

The "GetTextRect" function returns the rectangle of the tile portion, upon which button text should be centered for a tiled animation.

The "IsIntersecting" function checks to see if the point of the cursor intersects the current location. The point specified by the calling function uses the same coordinate system as the rectangle used when the animation is created or last moved.

The above functions enable applications to create an animation and play actions associated with them. While these functions have been described in the specific context of a Windows environment, similar functions can be implemented in other environments.

Animations are stored in the following file format. This format begins with the following header:

```
struct FLATACTORDIRHEADER {
    WORD wMagic;         // Must be 0x504C
    WORD wVerMaj;        // Must be 1
    WORD wVerMin;        // Must be 0
    WORD cFiles;
    WORD cbFileDir;
};
```

"cFiles" indicates the number of animations that are collected into this animation file. For animation files, it can be any number. This structure is followed by an array of cFiles+1 32 bit offsets to the beginning of each animation subfile. The last offset in this array is for the end of this file. The subfiles are arraigned contiguously in order, such that the size of any animation subfile can be quickly determined by subtracting adjacent array offsets.

This array is followed by a list of names for the animation subfiles. These names are stored in order with null terminators. The size of all the names is given by the "cbFileDir" field in the header.

The animation subfiles begin with the following header:

```
Struct FLATACTORHEADER {
    WORD sVersion;             // Must be size of
                               // (FLATACTORHEADER)
    ANIMTYPE at;               // PC, specialist, etc.
    IMAGE imageShow;           // Rest pose image
    ACTION actionDefault;
    POINT ptSizeTwips;
    POINT ptSizePixels;
    POINT ptPercentScreen;
    WORD wHelpfulness;
    SEX sex;
    RECT rcIntro;              // Where character appears in
                               // introduction
    IMAGE imageBackground;     // Image for character introduction
    // Tiling points:
    WORD cxStart;
    WORD cxTile;
    // Offsets relative to beginning of this structure
    ULONG lcbImages;
    ULONG lcbImageDir;
    ULONG lcbSounds;
    ULONG lcbSoundDir;
    ULONG lcbAnims;
    ULONG lcbAnimsDir;
    ULONG lcb Phrases;
```

-continued

```
    ULONG lcb PhraseDir;
};
```

All of the subfiles begin with the same header for all animation types, even though helpfulness, sex, and introduction information is not used for animations and tiling points are not used for characters. Offsets to various subfiles within the animation subfile are at the end of this structure, arraigned consecutively to allow easy computation of subfile size. These offsets are relative to the beginning of this animation subfile to allow animation subfiles to be easily relocated without fixing up offsets within the animation subfile.

All images are stored contiguously in a single image subfile. These images may be metafiles, bitmaps, or composites of other images. If the image is a bitmap, the first pixel (0,0) will be treated as a transparent color. A composite image contains a word indicating that it is a composite image and a word indicating the number of images in the composite, followed by an array of image numbers and rectangles in which those images should be displayed.

As with images, all sounds, and actions are stored in sound, and action subfiles. The image and sound directory files contain arrays of long (4 byte) offsets to the beginning of image or sound, with an additional offset at the end giving the length of the image or sound file. Thus, image number n is located from offset "rglcbImage[n]" to offset "rglcbImage[n+1]". These offsets are relative to the beginning of the image and sound subfiles, respectively.

The index files for actions serve to map a discontinuous range of numbers to information about the actions that correspond to those numbers in an arbitrary, many to many mapping. Each directory starts with a word count for how many numbers are defined, followed by a sorted array of fixed size elements containing the caption or phrase number, the number of actions or phrases defined for that number, and an index into an array of information for each action or phrase definition. This information consists of a long (4 byte) offset into the action or phrase file, and a short (2 byte) length for that action or phrase.

In the action file, an action definition starts with a header containing a version number and the number of events in the action. This is followed by an array of event records. An event record is a fixed size structure containing the type of event and additional information based on that type. Frame events contain the duration and image number. Branch events contain the destination event, and the probability of branching. Sound events contain the sound number and sound modifiers such as rate and volume.

Sounds are stored as waveforms in a format suitable for playing using Multimedia extensions. Images may be device independent bitmaps, metafiles, or composite images as described above.

Using this approach, a variety of controls can be created with both audio and visual responses. To further illustrate the design and operation of controls in this embodiment, a description of single state push buttons, and a multi-state control follows below.

In this implementation, there are twelve types of single state buttons: 1) squishy; 2) cancel; 3) back; 4) next; 5) ok; 6) rewind; 7) ffward; 8) up; 9) down; 10) image; 11) left; and 12) right.

For these button types except for the "image" type, the animation services load the appropriate animation file automatically. Setting the button type to "image" affords the application developer greater flexibility. When the button type is set to image, the developer must specify an appropriate animation file in the application, either .ani or .btn. If the file is a .btn file, the application also provides the specific animation key telling the animation services which animation in the .btn file to use.

Figure 4:
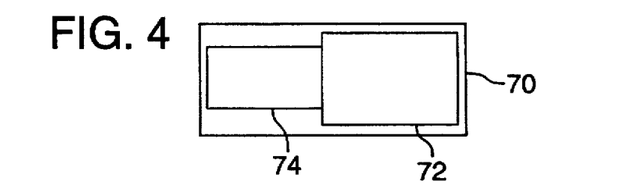
FIG. 4 illustrates an example of the alignment of a single state button control.

Single state buttons share common properties and behavior. The buttons have an animation area and a text area within the bounds of the entire button itself. FIG. 4 illustrates an example of the alignment of a single state button. The outer perimeter 70 defines the boundary of the entire button. The inner rectangle 72 on the right, in this example, defines the boundary of text. Similarly, the left rectangle 74 defines the boundary of animation for the control. The text area ban include both the text of a caption and also an optional static image which is drawn and offset with the text.

Each of the single state buttons has an animation file. This animation file has individual animations for a set of predefined events. Each animation consists of one or more frames with optional sound.

Figure 5:
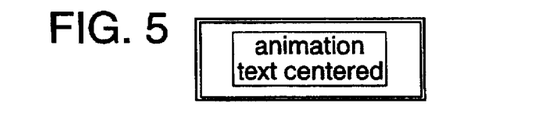
FIG. 5 depicts another example of the alignment of a single state button control with both animation and text areas vertically and horizontally centered.

FIG. 5 depicts a single state button with both animation and text areas vertically and horizontally centered. The animation fills the entire control area. Text is centered both horizontally and vertically within the animation area.

Table 3 below sets forth the predefined events as well as the corresponding visual response for a control having the alignment shown in FIG. 5.

TABLE 3

| STATE OF MOUSE | STATE OF CONTROL |
|---|---|
| Mouse down | Text and image are offset one pixel down and right on the first frame. |
| Mouse up (inside button) | Text and image are offset back up and left one pixel on first frame, and border highlight turns off. |
| Mouse up (outside button) | Text and image are offset back up and left on pixel on first frame, and border highlight turns off. |
| Mouse enter (mouse up) | Border highlights. |
| Mouse enter (mouse down) | Test and image are offset down and right one pixel on first frame, and border highlight |

TABLE 3-continued

| STATE OF MOUSE | STATE OF CONTROL |
|---|---|
| | turns on. |
| Mouse leave (mouse up) | Border highlight turns off. |
| Mouse leave (mouse down) | Text and image are offset back up and left one pixel on first frame, and border highlight turns off. |

Figure 6:
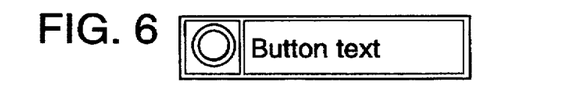
FIG. 6 illustrates an example of the appearance of a button control according to an embodiment of the invention.

FIG. 6 illustrates an example of a squishy button. This button is termed "squishy" because it emulates a flexible or squishy real-world button. When a user clicks on this button, it appears to be pressed in. Conversely, when the user releases the mouse button, the button appears to flex back up. To reinforce this visual response, the system emits a "squishy" sound that the user can readily associate with this button.

Figure 7:
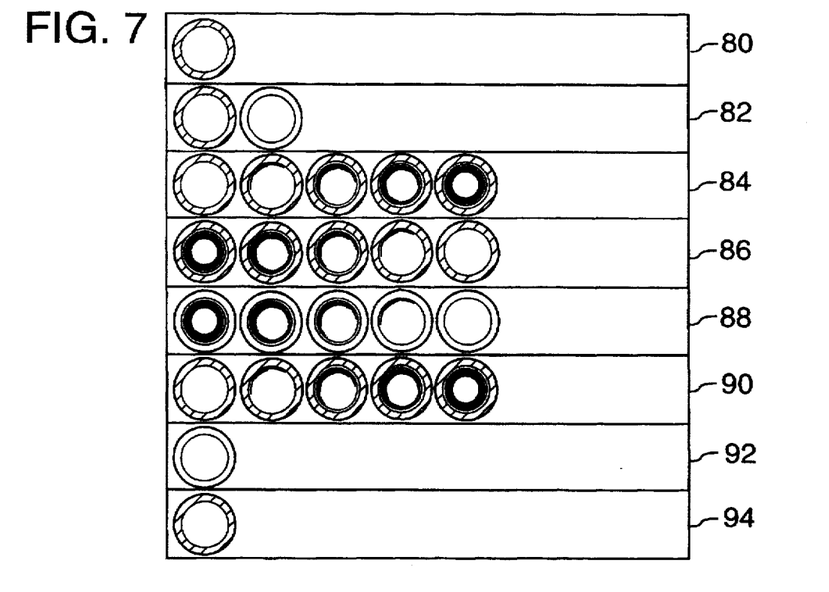
FIG. 7 illustrates examples of how a single state button control is animated according to an embodiment of the invention.

The following Table 4 and FIG. 7 help illustrate how this type of button is animated.

TABLE 4

| ACTION | VISUAL RESPONSE | DURATION | LOOP | AUDIO RESPONSE | EXAMPLE IMAGES |
|---|---|---|---|---|---|
| ID 0: Rest Pose | Single frame with rest image | 1 | | | FIG. 7, Item 80 |
| ID 2: Attract Mode | Flash to gain attention | 30 | 2 to 1 100% | ? | FIG. 7, Item 82 |
| ID 3: Mouse Down | Depress highlighted button | 2 (or longer if sound needs it) | | Push down sound | FIG. 7, Item 84 |
| ID 4: Mouse Up | Un-depress highlighted button | 2 (or longer is sound needs it) | | Do action sound | FIG. 7, Item 86 |
| ID 5: Mouse up (outside control) | (nothing) | | | | |
| ID 6: Mouse Leave (mouse down) | Un-depress unhighlighted button | 2 (or longer if sound needs it) | | Pop up sound | FIG. 7, Item 88 |
| ID 7: Mouse Enter (mouse down) | depress highlighted button | 2 (or longer if sound needs it) | | Push down sound | FIG. 7, Item 90 |
| ID 8: Mouse Leave (mouse up) | Unhighlighted | 1 | | | FIG. 7, Item 92 |
| ID 9: Mouse Enter (mouse up) | Highlight | 5 (time for sound) | | Pass-over sound | FIG. 7, Item 94 |

In a rest pose, the button is displayed with a single frame with a rest image. For attract mode, the image flashes to gain the users attention.

The series of images in FIG. 7 illustrates the sequence of images played back when the user presses a mouse button down over the control. The five successive images of the button emulate a button progressing from an unpressed state to a completely depressed state.

Another series of images in FIG. 7 illustrates a sequence of images representing release of the button. It the user moves the cursor outside the button while leaving the mouse down, the same sequence of images are played back. However, the system emits a pop up sound rather than the "do action" sound. If the user moves the cursor away from the control while leaving the mouse up, the button appears to remain in the rest image state and is unhighlighted. However, if the user moves the cursor over the control with the mouse button up, the control is then highlighted and the system emits a pass-over sound.

Figure 8:
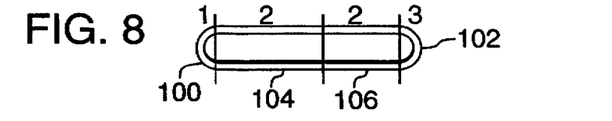
FIG. 8 illustrates an example of how another button control is drawn with frames of animation according to an embodiment of the invention.

FIG. 8 illustrates a button made by tiling. In this implementation, the single state buttons use a tiled animation file for the base button. The base button is drawn by slicing up the image in the base button animation frames and tiling the pieces until they are the correct length to fit in the button rectangle. Sections on each end are made up of a curved portion 100, 102 while intermediate sections 104, 106 are made up of tiled rectangle sections.

Figure 9:
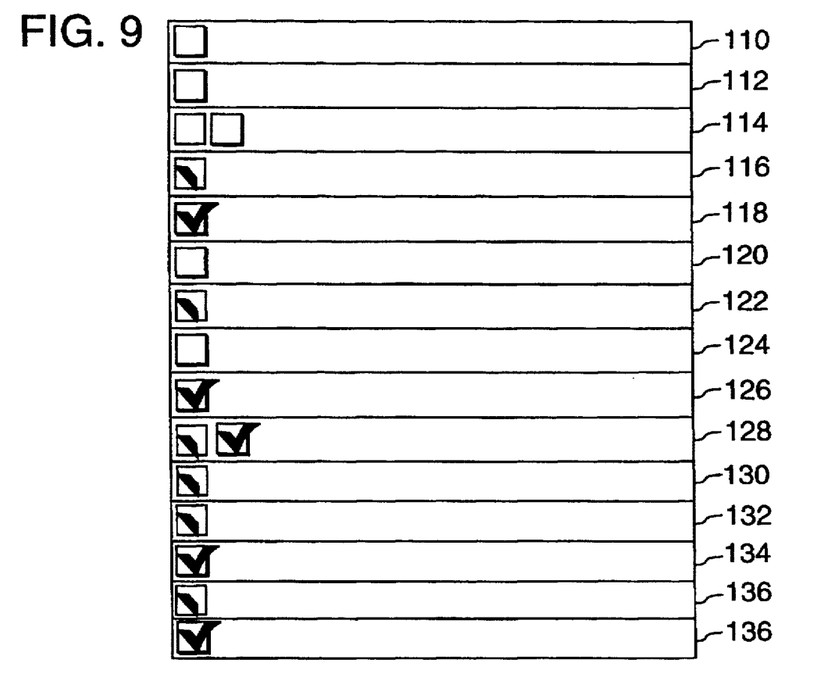
FIG. 9 illustrates examples of how a multi-state button control is animated according to an embodiment of the invention.

Table 5 and FIG. 9 illustrate the operation of a multi-state button. This example in particular is for a check box control, but the same concepts can apply to a variety of other multi-state controls.

As reflected in Table 5, check boxes have different animations for events when a button is checked and unchecked.

(204, 206). At this point, the user interface control is available for interaction with the user.

The system services 46 monitor mouse events relating to the control (208). As the user moves the cursor and/or clicks on the mouse button, Windows system services 49 send "mouse event" messages to systems services 46. Changes in the mouse position are detected by a global mouse hook, while changes in the state of the mouse button are detected by the Windows system services 49. The global mouse hook detects when the cursor enters or leaves the boundaries of a control, and in response sends mouse enter/leave messages

TABLE 5

| ACTION | VISUAL RESPONSE | DURATION | LOOP | SOUND RESPONSE | EXAMPLE IMAGES |
|---|---|---|---|---|---|
| ID 0: Rest Pose UNCHECKED | Rest image | 1 | | | FIG. 9, Item 110 |
| ID 1: Set Unchecked | Rest image | 1 | | | FIG. 9, Item 112 |
| ID 2: Attract Mode | Flash | 30 | 2 to 1 100% | ? | FIG. 9, Item 114 |
| ID 3: M-Down | Half check | 5 | | 1st half | FIG. 9, Item 116 |
| ID 4: M-Up | 2nd half check | 5 | | 2nd half | FIG. 9, Item 118 |
| ID,5: M-Up (out) | | | | | |
| ID 6: M-Leave (dn) | Uncheck | 5 | | Uncheck | FIG. 9, Item 120 |
| ID 7: M-Enter (dn) | Half check | 5 | | 1st half | FIG. 9, Item 122 |
| ID 8: M-Leave (up) | | | | | |
| ID 9: M-Enter (up) | (Sound only) | 5 | | Pass-over | FIG. 9, Item 124 |
| CHECKED | | | | | |
| ID 10: Set Checked | Rest image | 1 | | | FIG. 9, Item 126 |
| ID 11: Attract | Flash | 30 | 2 to 1 100% | ? | FIG. 9, Item 128 |
| ID 12: Down | Half uncheck | 5 | | 1st half? | FIG. 9, Item 130 |
| ID 13: Up | Finish uncheck | 5 | | 2nd half? | FIG. 9, Item 132 |
| ID 14: Up (out) | | | | | |
| ID 15: Leave (dn) | Recheck | 5 | | 2nd half? | FIG. 9, Item 134 |
| ID 16: Enter (dn) | Half uncheck | 5 | | 1st half? | FIG. 9, Item 136 |
| ID 17: Leave (up) | | | | | |
| ID 18: Enter (up) | (Sound only) | | | Pass-over | FIG. 9, Item 138 |

Figure 10:
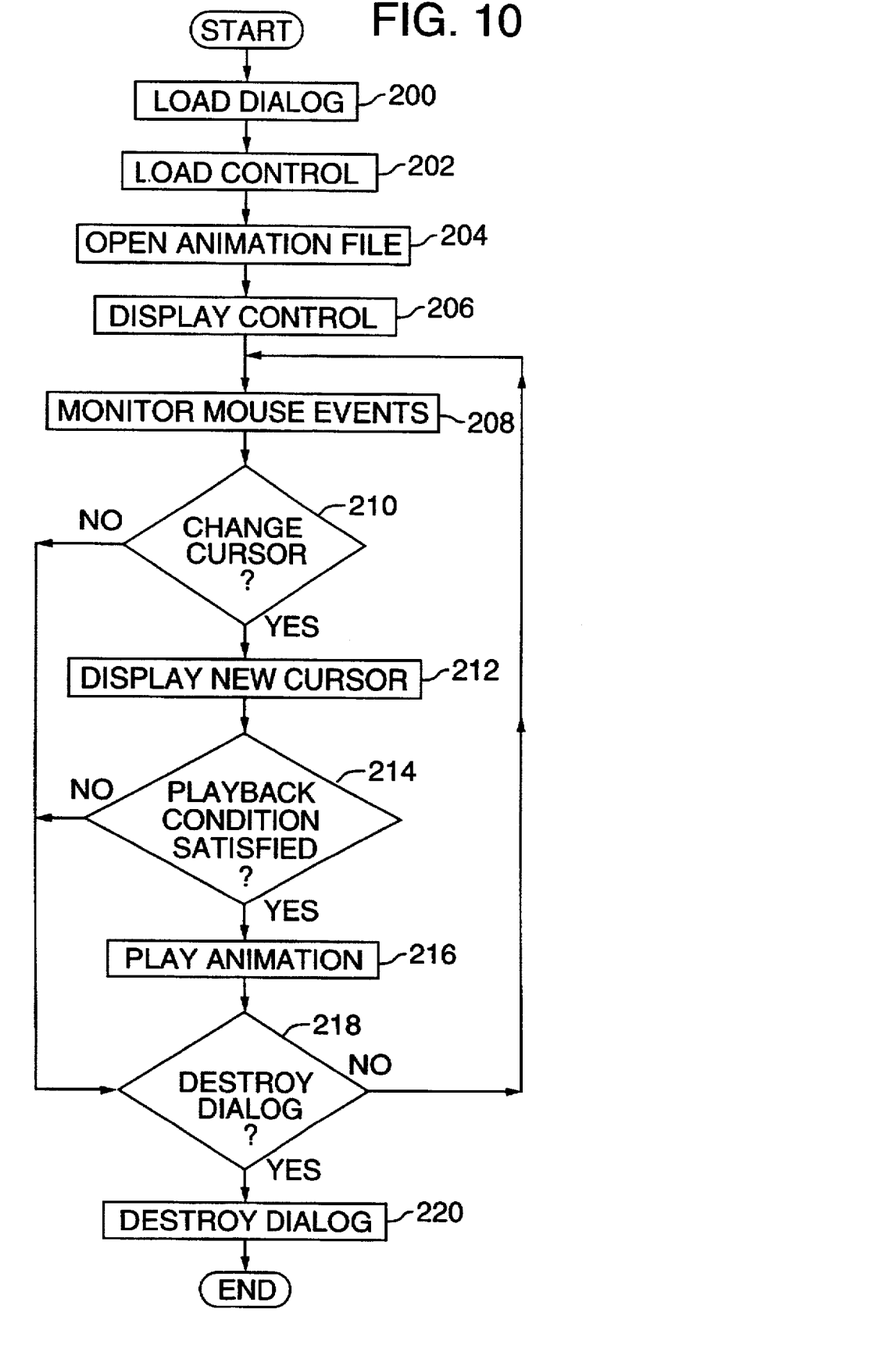
FIG. 10 is a flow diagram illustrating the operation of an audio visual control according to an embodiment of the invention.

Having described the user interface controls in detail, we now summarize their operation. FIG. 10 is a flow diagram illustrating the operation of an audio visual control in one embodiment. This sequence of steps is an example only. It should be understood that the steps and sequence of events can vary depending on the implementation as well as the sequence and nature of input events. This example does not attempt to capture all combinations of user input events that can result in display of a control, playback of animation or sound for the control, or destruction of the control. Instead, it gives an example of one possible implementation and illustrates aspects of that possible implementation.

An example sequence of displaying and playing the user interface control proceeds as follows. In this example, the control resides in a dialog box. First, an application loads the dialog box (200), including the user interface controls (202) in the dialog box.

After the user interface control is loaded, the application calls the animation services (in the system services 46, FIG. 2) to open and display corresponding animation file or files to the control. The Windows system services send mouse down, mouse up, and double click event messages to the control.

The control initiates playback when the position and state of the mouse button satisfy predefined user input events (214, 216). In this example, the predefined user input events are predefined mouse event messages such as mouse enter/leave and mouse up/down and double-click. The control calls the animation services to control the playback of an animation file in response to mouse enter/leave messages from the global mouse hook, and/or in response to the mouse up/down and double click messages from the Windows system services 49.

A control can also change the appearance of the cursor in response to predefined user input events. In one embodiment, the control changes the appearance of the cursor from a pointing arrow to a pointing finger (210, 212) in response to the mouse enter/leave messages received from the Windows system services 49. In response to receiving a mouse enter message, for instance, the control calls a procedure to set the cursor to a pointing finger from an arrow. To change the cursor back to its original form upon receiving a mouse leave message, the control calls a procedure to set the cursor back to an arrow. In this simple example, the step of displaying a new cursor precedes playback of animation. However, it should be understood that the visual and audio feedback can be programmed to occur in response to a variety of different input events.

The application can remove the control from the display in a variety of different ways. The flow diagram illustrates an example where the application removes the control by destroying the dialog in which it resides (218). When the animation has finished playing after a mouse up or double click event, the control sends a click or double click event to the application. The application may then destroy the dialog (218, 220), which in turn destroys the control. In some cases, the control may simply return to a rest state after playing an animation file. In these cases, the control continues monitoring input events as described above.

While we have described in detail an embodiment of the invention, it should be understood that the implementation of the invention can vary. For example, it is not critical that the controls be implemented using animation files as described. Other structures can be used to associated images and sounds with a control. Also, we have described an embodiment as implemented in a PC running the Windows Operating System from Microsoft Corporation. The controls described can be implemented in other graphical environments as well.

In view of the many possible embodiments to which the principles of our invention may be put, it is emphasized that the detailed embodiment described herein is illustrative only and should not be taken as limiting the scope of our invention. Rather, we claim as our invention all such embodiments as may come within the scope and spirit of the following claims and equivalents thereto.

Appendix

Forming a part of the present specification is Appendix A. Copyright in this appendix is maintained by Microsoft Corporation.

Appendix A

OK/Cancel Family

Family Classification: Common decision tree. The user can proceed by clicking OK, or not proceed by clicking Cancel.
Visual Classification: Horizontal rectangle with rounded corners.
Tactile Classification: Hard plastic.

1. Sound when mouse goes from up to down while within control: a firm "click"
2. Sound when leaving control while mouse still down: a firm "click", slightly softer than #1
3. Re-entering the control while the mouse is still down, assuming the mouse had gone from up to down within the control initially: same sound as #1
4a. Sound when entering control when the mouse is up: Very tiny, metallic click to accompany visual illumination of control's edge.
4b. Sound when leaving control when the mouse is up: None. In an alternative implementation, the control can be designed to make a tiny sound when the light goes off.
5. Mouse up within the control, assuming it went from up-to-down within the control initially:
   OK—a musical, emphatic tone that reinforces the concept of "doing something".
   Cancel—an airy, fading-away sound that reinforces the concept of backing out of a procedure or "not doing something".

Yes/No/Cancel Family

Family Classification: Common decision tree. User can proceed by clicking "yes", proceed by clicking "no", or not proceed by clicking Cancel.
Visual Classification: Horizontal rectangle with rounded corners.
Tactile Classification: Hard plastic.

1. Sound when mouse goes from up to down while within control: a firm "click"
2. Sound when leaving control while mouse still down: a firm "click", slightly softer than #1
3. Re-entering the control while the mouse is still down, assuming the mouse had gone from up to down within the control initially: same sound as #1
4a. Sound when entering control when the mouse is up: Very tiny, metallic click to accompany visual illumination of control's edge.
4b. Sound when leaving control when the mouse is up: None.
5. Mouse up within the control, assuming it went from up-to-down within the control initially:
   Yes—a musical, emphatic tone that reinforces the concept of "doing something affirmative", similar or identical to OK in OK/Cancel family.
   No—an abrupt, buzzy tone that reinforces "doing something negative". Same energy as OK but more negative tone.
   Cancel—an airy, fading-away sound that reinforces the concept of backing out of a procedure or "not doing something". Same as Cancel in OK/Cancel family

Rewind, Back, Next, Fast Forward Family

Family Classification: Transport or wizard navigation. User can move to the first state of the sequence by clicking Rewind, move to the previous state of the sequence by clicking Back, move to the next state by clicking Next, or move to the last state of the sequence by clicking FF.
Visual classification: Horizontal rectangle with rounded corners.
Tactile Classification: Hard plastic (added metallic quality when active)

1. Sound when mouse goes from up to down while within control: a firm "click"
2. Sound when leaving control while mouse still down: a firm "click", slightly softer than #1
3. Re-entering the control while the mouse is still down, assuming the mouse had gone from up to down within the control initially: same sound as #1
4a. Sound when entering control when the mouse is up: Very tiny, metallic click to accompany visual illumination of control's edge.
4b. Sound when leaving control when the mouse is up: None, by design.
5. Sound when mouse goes down-to-up within the control, assuming it went from up-to-down within the control initially:
   Rewind—metallic whirring "to the beginning", a winding-up quality
   Back—a single ratchet, winding-up quality
   Next—a single ratchet, a releasing-tension quality
   FF—metallic whirring "to the end", a releasing-tension quality

Squishy Control

Family Classification: Selection. In this implementation, the squishy controls are the most common method for selecting a desired action, the appropriate answer to a question, etc.

Visual Classification: Circular with raised, spherical center.
Tactile Classification: Soft, rubbery plastic. Spherical cap collapses when pressed, pops back into form when released.

1. Sound when mouse goes from up to down while within control: a soft, airy, rubbery, whoosh.
2. Sound when leaving control while mouse still down: soft, airy, rubbery, whoosh, slightly softer than #1
3. Re-entering the control while the mouse is still down, assuming the mouse had gone from up to down within the control initially: same sound as #1
4a. Sound when entering control when the mouse is up: Very tiny, metallic click to accompany visual illumination of control's edge.
4b. Sound when leaving control when the mouse is up: None, by design.
5. Sound when mouse goes down-to-up within the control, assuming it went from up-to-down within the control initially:
  Normally the same as #2. These controls tend not to launch actions, but instead just make a selection. Therefore the sound of the button popping up is not conceptually masked by the larger sound of some action.

We claim:

1. A method for providing an interactive user interface control in a graphical user interface of a programmed computer system, including a pointing device, a display device, and an audio device, the method comprising:

displaying a control upon which a user positions a cursor to enter input;

the control having a set of predefined user input events, wherein the set of predefined user input events includes a user input event that properly actuates the control and a plurality of user input events that do not properly actuate the control;

the control having a set of visual and audio responses that are played in response to the set of predefined user input events, wherein the set of visual and audio responses provides graphical and audio feedback to indicate to the user when the user is properly actuating the control and when the user is improperly actuating the control;

monitoring position of a cursor associated with the pointing device or state of the pointing device to detect the set of predefined user input events;

in response to detecting a user input event that properly actuates the control while the control is active, simultaneously displaying a corresponding visual response in the control and playing a corresponding audio response from memory of the programmed computer system to indicate to the user that the user is properly positioning the cursor on the control; and in response to detecting a user input event that does not properly actuate the control while the control is active, displaying a corresponding visual response in the control or playing a corresponding audio response from memory of the programmed computer system to indicate to the user that the user is not properly positioning the cursor on the control.

2. The method of claim 1 further including displaying a first family of controls having a first set of common visual and audio responses corresponding to a first set of predefined user input events;

displaying a second family of controls having a second set of common visual and audio responses corresponding to a second set of predefined user input events, wherein the audio responses in the first set of common visual and audio responses are different from the audio responses in the second set of common visual and audio responses;

monitoring position and state of a pointing device to detect the first and second set of predefined user input events;

in response to detecting a predefined event in the first set of predefined user input events, simultaneously displaying a corresponding visual response and playing a corresponding audio response of the first set from memory of the programmed computer system; and in response to detecting a predefined event in the second set of predefined user input events, simultaneously displaying a corresponding visual response and playing a corresponding audio response of the second set from memory of the programmed computer system.

3. The method of claim 1 further including displaying a first family of controls having a first set of common visual and audio responses corresponding to a first set of predefined user input events;

displaying a second family of controls having a second set of common visual and audio responses corresponding to a second set of predefined user input events, wherein the visual responses in the first set of common visual and audio responses are different from the visual responses in the second set of common visual and audio responses;

monitoring position and state of a pointing device to detect the first and second set of predefined user input events;

in response to detecting a predefined event in the first set of predefined user input events, simultaneously displaying a corresponding visual response and playing a corresponding audio response of the first set from memory of the programmed computer system; and in response to detecting a predefined event in the second set of predefined user input events, simultaneously displaying a corresponding visual response and playing a corresponding audio response of the second set from memory of the programmed computer system.

4. The method of claim 1 further including displaying a first family of controls having a first set of common visual and audio responses corresponding to a first set of predefined user input events;

displaying a second family of controls having a second set of common visual and audio responses corresponding to a second set of predefined user input events, wherein the visual and audio responses in the first set of common visual and audio responses are different from the visual and audio responses in the second set of common visual and audio responses;

monitoring position and state of a pointing device to detect the first and second set of predefined user input events;

in response to detecting a predefined event in the first set of predefined user input events, simultaneously displaying a corresponding visual response and playing a corresponding audio response of the first set from memory of the programmed computer system; and in response to detecting a predefined event in the second set of predefined user input events, simultaneously displaying a corresponding visual response and playing a corresponding audio response of the second set from memory of the programmed computer system.

5. The method of claim 4 wherein the first set of common visual and audio responses include common animated and audio feedback played simultaneously to indicate proper actuation of the controls in the first family in response to a user input event that causes the proper actuation of the controls and further include common visual and audio feedback played simultaneously to indicate improper actuation of the controls in the first family in response to a user input event that causes the improper actuation of the controls; and     the second set of common visual and audio responses include common animated and audio feedback played simultaneously to indicate proper actuation of the controls in the second family in response to a user input event that causes the proper actuation of the controls and further include common visual and audio feedback played simultaneously to indicate improper actuation of the controls in the second family in response to a user input event that causes the improper actuation of the controls.

6. The method of claim 1 wherein a visual response in the visual responses is comprised of a sequence of images from an animation in an animation file.

7. The method of claim 1 wherein a visual response in the visual responses is comprised of frames of animation in an animation file.

8. The method of claim 1 wherein an audio response in the audio responses is comprised of a wave file.

9. The method of claim 1 wherein an audio response in the audio responses is comprised of more than one wave file.

10. The method of claim 1 wherein a visual and an associated audio response in the visual and audio responses are comprised of an animation frame and an associated sound frame.

11. The method of claim 1 wherein the control emulates a push button having an outer boundary and an inner section defined by an inner boundary, and the displaying a corresponding visual response includes the step of:

shifting the inner section by a predefined number of pixels in response to detecting a predefined input event;

and the playing a corresponding audio response includes playing a button down sound.

12. The method of claim 1 wherein the control emulates a push button, and the displaying a corresponding visual response includes the step of:

displaying a sequence of animation frames emulating depressing the push button;

and the playing a corresponding audio response includes playing a button down sound.

13. The method of claim 1 further including:

changing an image associated with the cursor to a new image from an original cursor image in response to detecting that the cursor is positioned over the control on a display of the display device;

displaying the new image on the display of the display device for as long as the cursor is positioned over the control; and     changing the image associated with the cursor to the original cursor image in response to detecting that the cursor is no longer positioned over the control on the display of the display device.

14. The method of claim 1 further including:

in response to detecting a first predefined user input event corresponding to actuating a button of the pointing device while the cursor is positioned over the control, playing a first combined animated and audio response to reinforce to the user that the user is actuating the control; and     in response to detecting a second predefined user input event corresponding to releasing the button of the pointing device while the cursor is positioned over the control, playing a second combined animated and audio response which is different from the first audio response to reinforce to the user that the user is actuating the control.

15. The method of claim 1 further including:

in response to detecting a first predefined user input event corresponding to actuating a button of the pointing device while the cursor is positioned over the control in an inactive state, playing a first audio response to indicate that the control is inactive; and     in response to detecting the first predefined user input event while the cursor is positioned over the control in an active state, playing a visual response and a second audio response which is different from the first audio response to indicate that the control is active.

16. A computer readable medium having instructions for performing the steps of claim 1.

17. A method for providing an interactive user interface control in a graphical user interface of a programmed computer system, including a pointing device, a display device, and an audio device, the method comprising:

displaying a control upon which a user positions a cursor to enter input, the control having a boundary defining a two dimensional space occupied by the control on the display device;

associating a set of predefined user input events with a position of a cursor and state of the pointing device relative to the boundary of the control, wherein the set of predefined user input events includes a user input event that properly actuates the control and a plurality of user input events that do not properly actuate the control;

associating a set of visual and audio responses with the control and with the set of predefined user input events, wherein the set of visual and audio responses provides a plurality of graphical and audio feedback to indicate to the user when the user is properly actuating the control and when the user is improperly actuating the control;

monitoring the position of a cursor on a display of the display device as positioned by a user with the pointing device, and monitoring the state of the pointing device to detect the set of predefined user input events;

in response to detecting the user input event that properly actuates the control while the control is active, simultaneously displaying a corresponding visual response in the control and playing a corresponding audio response to indicate to the user that the user is properly positioning the cursor on the control; and     in response to detecting a user input event that does not properly actuate the control while the control is active, displaying a corresponding visual response in the control to indicate to the user that the user is not properly positioning the cursor on the control.

18. The method of claim 17 further including:

in response to detecting a predefined user input event from the set of predefined user input events, displaying a sequence of frames of animation frames.

19. The method of claim 17 further including:

in response to detecting a predefined user input event corresponding to the cursor passing over the boundary of the control, changing the appearance of the cursor for as long as the cursor is within the boundary of the control; and changing the image associated with the cursor to the original cursor image in response to detecting that the cursor is no longer positioned over the control on the display of the display device.

20. The method of claim 17 further including:

in response to detecting a predefined user input event corresponding to the cursor passing over the boundary of the control, changing the visual appearance of the control.

21. The method of claim 17 further including:

in response to detecting a predefined user input event corresponding to the cursor passing over the boundary of the control, changing the visual appearance of the control, and changing the appearance of the cursor for as long as the cursor is within the boundary of the control.

22. The method of claim 17 further including:

in response to detecting a predefined user input event corresponding to the cursor passing over the boundary of the control, changing the visual appearance of the control, changing the appearance of the cursor for as long as the cursor is within the boundary of the control, and playing an associated sound with the changing of the visual appearance of a control.

23. The method of claim 17 further including:

in response to detecting a first predefined user input event corresponding to actuating the pointing device down while the cursor is positioned over the control, playing a first audio response; and in response to detecting a second predefined user input event corresponding to releasing the pointing device while the cursor is positioned over the control, playing a second audio response, which is different from the first audio response.

24. The method of claim 17 further including:

in response to detecting a first predefined user input event corresponding to actuating the pointing device down while the cursor is positioned over the control in an inactive state, playing a first audio response to indicate the control is inactive; and in response to detecting the first predefined user input while the cursor is in the active state, playing a second audio response, which is different from the first audio response to indicate that the control is active.

25. A user interface control in a programmed computer system, upon which a user positions a cursor to enter input, the control comprising:

control boundary data for defining a boundary of the control in a display, the control boundary data stored in an animation file in memory;

a set of predefined user input events associated with the control, wherein the set of predefined user input events includes a user input event that properly actuates the control and a plurality of user input events that do not properly actuate the control while the control is active;

a set of image files in memory linked to the set of predefined user input events, wherein the image files provide graphical feedback to indicate to the user when the control is properly and improperly actuated while the control is active;

a set of sound wave files in memory linked to the set of predefined user input events, wherein the sound wave files provide aural feedback to indicate to the user when the control is properly and improperly actuated while the control is active;

a procedure for receiving user input messages that report the predefined user input events, for controlling the display of an image from the image files in the boundary of the control in response to a first user input message, and for controlling the playback of a sound wave file in response to the first input message, for controlling the display of a different image from the image files in response to a second input message, and for controlling the playback of a different sound wave file in response to the second input message, where the first message corresponds to the user input event in which the cursor is properly positioned on the control, and the second message corresponds to one of the user input events in which the cursor is not properly positioned on the control.

\* \* \* \* \*